(12) United States Patent
Buck, Jr. et al.

(10) Patent No.: US 9,989,649 B2
(45) Date of Patent: Jun. 5, 2018

(54) SYSTEMS AND METHODS FOR POWER EFFICIENT TRACKING

(71) Applicant: BI Incorporated, Boulder, CO (US)

(72) Inventors: James J. Buck, Jr., Longmont, CO (US); Cady Lyn Brooks, Nederland, CO (US); Joseph P. Newell, Louisville, CO (US)

(73) Assignee: BI Incorporated, Boulder, CO (US)

(*) Notice: Subject to any disclaimer, the term of this patent is extended or adjusted under 35 U.S.C. 154(b) by 10 days.

(21) Appl. No.: 14/700,902

(22) Filed: Apr. 30, 2015

(65) Prior Publication Data

US 2015/0327214 A1  Nov. 12, 2015

Related U.S. Application Data

(60) Provisional application No. 61/989,354, filed on May 6, 2014.

(51) Int. Cl.

| | |
|---|---|
| *H04W 64/00* | (2009.01) |
| *G01S 19/34* | (2010.01) |
| *H04W 4/02* | (2018.01) |
| *G01S 19/48* | (2010.01) |
| *H04W 84/12* | (2009.01) |
| *H04W 88/08* | (2009.01) |

(52) U.S. Cl.
CPC .............. *G01S 19/34* (2013.01); *G01S 19/48* (2013.01); *H04W 4/028* (2013.01); *H04W 64/006* (2013.01); *H04W 84/12* (2013.01); *H04W 88/08* (2013.01); *Y02D 70/00* (2018.01); *Y02D 70/142* (2018.01); *Y02D 70/144* (2018.01); *Y02D 70/164* (2018.01)

(58) Field of Classification Search
None
See application file for complete search history.

(56) References Cited

U.S. PATENT DOCUMENTS

| | | | |
|---|---|---|---|
| 7,930,927 B2 | 4/2011 | Cooper et al. | |
| 8,493,219 B2 | 7/2013 | Buck et al. | |
| 8,576,065 B2 | 11/2013 | Buck et al. | |
| 8,629,776 B2 | 1/2014 | Buck et al. | |
| 8,657,744 B2 | 2/2014 | Rompa et al. | |
| 8,738,035 B1 * | 5/2014 | Ramakrishnan | G01S 19/48 342/451 |
| 8,958,854 B1 * | 2/2015 | Morley | H04M 1/72563 455/574 |
| 8,983,490 B2 * | 3/2015 | Un | H04W 64/00 455/456.1 |
| 9,179,263 B2 * | 11/2015 | Willins | H04W 4/027 |
| 9,240,118 B2 | 1/2016 | Melton | |
| 9,241,659 B2 | 1/2016 | Rompa et al. | |
| 2008/0227463 A1 * | 9/2008 | Hizume | H04W 64/00 455/456.1 |

(Continued)

OTHER PUBLICATIONS

U.S. Appl. No. 13/919,862, filed Jun. 16, 2013, Newell et al.
U.S. Appl. No. 14/966,135, filed Dec. 11, 2015, Donald A. Melton.

*Primary Examiner* — Vladimir Magloire
*Assistant Examiner* — Frank Donado
(74) *Attorney, Agent, or Firm* — Hamilton, DeSanctis & Cha

(57) ABSTRACT

Various embodiments of the present invention provide systems and method for power efficient tracking.

19 Claims, 5 Drawing Sheets

(56) References Cited

U.S. PATENT DOCUMENTS

| | | | |
|---|---|---|---|
| 2011/0154887 A1 | 6/2011 | Cooper et al. | |
| 2012/0052793 A1* | 3/2012 | Brisebois | H04W 88/06 |
| | | | 455/1 |
| 2013/0006066 A1 | 1/2013 | Melton | |
| 2013/0029686 A1* | 1/2013 | Moshfeghi | G01S 19/48 |
| | | | 455/456.1 |
| 2013/0281130 A1* | 10/2013 | Yang | G01S 19/09 |
| | | | 455/456.3 |
| 2014/0128021 A1* | 5/2014 | Walker | H04W 52/0212 |
| | | | 455/405 |
| 2014/0159953 A1* | 6/2014 | Whelan | G01S 19/34 |
| | | | 342/357.63 |
| 2014/0365488 A1* | 12/2014 | Arslan | G01S 5/0242 |
| | | | 707/736 |
| 2015/0048948 A1 | 2/2015 | Buck et al. | |
| 2015/0049681 A1* | 2/2015 | Huang | H04W 72/1289 |
| | | | 370/329 |
| 2015/0061864 A1 | 3/2015 | Buck et al. | |
| 2015/0078622 A1 | 3/2015 | Buck et al. | |
| 2015/0131085 A1 | 5/2015 | Cooper et al. | |
| 2015/0228184 A1 | 8/2015 | Buck et al. | |
| 2015/0279200 A1 | 10/2015 | Buck et al. | |
| 2015/0304437 A1* | 10/2015 | Vaccari | G06F 1/3215 |
| | | | 709/204 |
| 2015/0332573 A1* | 11/2015 | Selmanovic | H04L 67/1095 |
| | | | 455/457 |

\* cited by examiner

SYSTEMS AND METHODS FOR POWER EFFICIENT TRACKING

CROSS REFERENCE TO RELATED APPLICATION

The present application claims priority to (i.e., is a non-provisional of) U.S. Pat. App. No. 61/989,354 entitled "Systems and Methods for Power Efficient Location Tracking", and filed May 6, 2014 by Buck et al. The entirety of the aforementioned application is incorporated herein by reference for all purposes.

BACKGROUND OF THE INVENTION

The present invention is related to monitoring movement, and in particular to systems and methods for power efficient tracking.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward. In many monitoring systems, the lack of sufficient mobile power limits the ability of a monitoring agency to know the movement details of a tracked individual.

Thus, for at least the aforementioned reasons, there exists a need in the art for more advanced approaches, devices and systems for monitoring.

BRIEF SUMMARY OF THE INVENTION

The present invention is related to monitoring movement, and in particular to systems and methods for power efficient tracking.

Various embodiments provide monitoring systems that include a monitoring device and a central monitoring controller. The monitoring device includes: a GPS based location determination circuit operable to identify a GPS based location of the monitoring device using GPS signals; a Wi-Fi based location determination circuit operable to identify a Wi-Fi access point and a corresponding signal strength from a Wi-Fi signal; and a controller circuit. The controller circuit is operable to: select at least one of the GPS based location and the combination of the Wi-Fi access point and the corresponding signal strength as a transmission data set; and transmit the transmission data set to a central monitoring controller. The central monitoring controller is operable to resolve the Wi-Fi access point and the corresponding signal strength to a Wi-Fi based location of the monitoring device This summary provides only a general outline of some embodiments according to the present invention. Many other objects, features, advantages and other embodiments of the present invention will become more fully apparent from the following detailed description, the appended claims and the accompanying drawings and figures.

BRIEF DESCRIPTION OF THE DRAWINGS

A further understanding of the various embodiments of the present invention may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
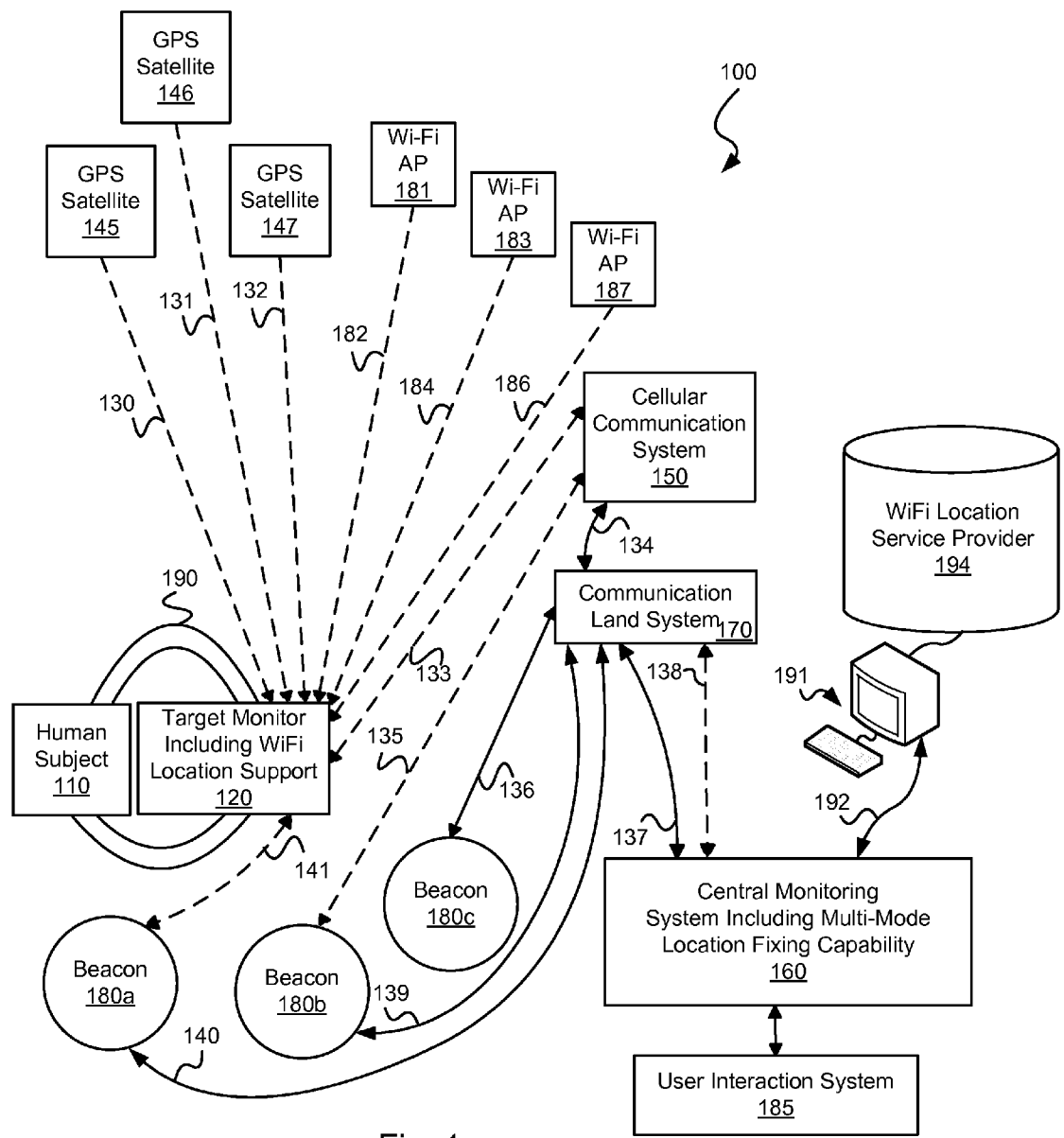
FIG. 1a is a block diagram illustrating a monitoring system including Wi-Fi based locating capability in accordance with various embodiments of the present invention.

The present invention is related to monitoring movement, and in particular to systems and methods for power efficient tracking.

Various embodiments provide monitoring systems that include a monitoring device and a central monitoring controller. The monitoring device includes: a GPS based location determination circuit operable to identify a GPS based location of the monitoring device using GPS signals; a Wi-Fi based location determination circuit operable to identify a Wi-Fi access point and a corresponding signal strength from a Wi-Fi signal; and a controller circuit. The controller circuit is operable to: select at least one of the GPS based location and the combination of the Wi-Fi access point and the corresponding signal strength as a transmission data set; and transmit the transmission data set to a central monitoring controller. The central monitoring controller is operable to resolve the Wi-Fi access point and the corresponding signal strength to a Wi-Fi based location of the monitoring device.

In some instances of the aforementioned embodiments, the monitoring device further includes a cellular transmitter. In such instances, transmitting the transmission data set to the central monitoring controller may be done using the cellular transmitter via a cellular network. In other instances of the aforementioned embodiments, the Wi-Fi based location determination circuit includes a Wi-Fi transmitter. In such instances, transmitting the transmission data set to the central monitoring controller is done using the Wi-Fi transmitter via the Wi-Fi access point. In one or more instances of the aforementioned embodiments, resolving the Wi-Fi access point and the corresponding signal strength to the Wi-Fi based location of the monitoring device includes: transmitting the Wi-Fi access point and the corresponding signal strength to a service provider; and receiving the Wi-Fi based location from the service provider. In particular instances of the aforementioned embodiments where selecting the at least one of the GPS based location and the combination of the Wi-Fi access point and the corresponding signal strength as the transmission data set is based at least in part on a determination of whether the monitoring device is operating indoors or outdoors. In other instances of the aforementioned embodiments, selecting the at least one of the GPS based location and the combination of the Wi-Fi access point and the corresponding signal strength as the transmission data set is based at least in part on a determination of a cost of resolving the Wi-Fi access point and the corresponding signal strength to the Wi-Fi based location. In some cases, the monitoring device further includes a power status sensor circuit operable to indicate a low power status of the monitoring device. In such cases, selecting the at least one of the GPS based location and the combination of the Wi-Fi access point and the corresponding signal strength as the transmission data set may be based at least in part on the low power status. In one or more instances of the aforementioned embodiments, selecting the at least one of the GPS based location and the combination of the Wi-Fi access point and the corresponding signal strength as the transmission data set results in selecting both the GPS based location and the combination of the Wi-Fi access point and the corresponding signal strength as the transmission data set; and the central monitoring controller is further operable to combine the GPS based location and the Wi-Fi based location to yield a unified location.

Various embodiments of the present invention utilize Wi-Fi access points as part of a group of positioning information used to establish the location of a monitored target. It should be noted that while this disclosure discusses the use of Wi-Fi access points that other location information may be including, but not limited to, Bluetooth, TV and/or radio tower transmissions, and any multiple signals of opportunity in the future could also apply. Various embodiments of the present invention may access first party or third party databases indicating physical locations of Wi-Fi access points. Use of such Wi-Fi positioning is a valid location technology and can be accurate in urban and densely populated environments.

Wi-Fi positioning uses a database of access point locations to resolve Wi-Fi access point identification and signal strength information sensed by a tracking device and provided to a service provider (either first party or third party) that maintains the database. Wi-Fi access points are deployed in a number of locations that is growing. At any given time, a tracking device may be able to sense one or more Wi-Fi access points and determine a strength of signal from each sensed accessed point at the location of the tracking device. By identifying the sensed access points and the corresponding signal strength, a reasonable approximation of the location of the tracking device may be determined. As mentioned above, other technologies such as, for example, Bluetooth Low Energy (BLE) may be similarly used either in place of Wi-Fi technology or in addition to the Wi-Fi technology to provide location tracking data.

In operation, a tracking device senses a signal from one or more Wi-Fi access points. From this, the tracking device senses the identification of each of the one or more Wi-Fi access points along with a strength of each of the sensed signals. This information is provided to a central monitoring system where it may be used to estimate a location of the tracking device or where it may be provided to a service provider that resolves the provided information into a physical location of the tracking device. The physical location may be returned as a latitude/longitude coordinate pair for the tracking device.

Due to the short-range nature of Wi-Fi signals (which can typically extend 100 meters or less), the uncertainty area of Wi-Fi based location is smaller than many other adjunct location methods such as AFLT (i.e., advanced forward link trilateration). When multiple observations are combined in a single request, the uncertainty area can be further reduced through trilateration. Expected accuracies can range from 5 to 100 meters. Though it is not accurate to a 1 meter range, it does offer a solution that GPS cannot. Additionally, indoor positioning using Wi-Fi is a more accurate solution than AFLT because in most situations you will have more Access Points in a closer proximity than cellular towers.

When no Wi-Fi and GPS are available, it is possible to send the identification number of the cell tower the device is connecting though to the Wi-Fi database provider to get the position of the tower. The accuracy of this position can be between 50 to 5000 meters. Accuracy can be further improved using inertial sensor information such as data provided by a gyroscope, accelerometer and magnetometer to deliver more precise location information indoors.

The stated accuracy for an AFLT location is limited to the geometry of cell towers surrounding the device requesting location information. In an area dense with cellular towers such as downtown Denver, the accuracy can be less than 5 meters. However, in a rural environment with only one cellular tower servicing the area, the accuracy can be much less at up to 1500 meters.

By having multiple tracking technologies (e.g., GPS, Wi-Fi, AFLT) the cost of tracking the location of the tracking device may be reduced where the most cost effective tracking methods are selected for location determination. Alternatively, or in addition, having access to multiple tracking technologies may also be used to preserve the battery power of the tracking device by allowing for the selection of the most power effective approach for determining location given a set of parameters. For example, Wi-Fi may be used in place of GPS where it offers a power savings and where GPS is not effective such as, for example, indoors. As another example where the tracking device is indoors, Wi-Fi location capability may be used rather than AFLT as Wi-Fi requires less power.

In some embodiments, having the Wi-Fi access point data aggregated at a central monitoring system provides the capability to choose which third party service provider(s) to be used for resolving location based upon the access point identification and sensed signal strength. There may be, for example, locations where one third part service provider offers better location indoor Wi-Fi capabilities than another; this is especially true in the international markets. By having the ability to determine which aggregator to use, the price point for a location fix could be reduced as well.

A number of different criteria may be used to select which of the available position determination technologies supported by a tracking device is used. For example, it may be determined whether sufficient battery power remains in the tracking device to support a particular position determination technology. Where insufficient power remains, the particular technology is disabled. In some cases a maximum cost of resolving location may be set for a particular tracking device. For example, resolving Wi-Fi location data may incur a per transaction cost to have a third party service provider resolve the location information. When a maximum number of resolution requests have been issued, the Wi-Fi position determination technology may be disabled. Resolving location based upon Wi-Fi access point identification and signal strength may require payment to a third party service provider which may vary with a low frequency access used to save tracking device power and a higher frequency used to provide greater accuracy in the location of a tracked individual. Further, it may be determined the likelihood that a particular position determination technology will be capable of providing meaningful location information. For example, where the tracking device goes indoors, the GPS position determination technology may be disabled to save power. Alternatively, where the tracking device is traveling at relatively high speeds, the Wi-Fi position determination technology may be disabled. As yet another example, where cellular phone jamming is occurring, the AFLT position determination technology may be disabled. As yet another example, where GPS jamming is occurring, the GPS position determination technology may be disabled. As yet another example, where the tracking device is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as AFLT or GPS may be used.

In one particular embodiment of the present invention, which position determination technologies are enabled may follow the following decision tree:

```
IF (Tracking Device Battery Low){
    Enable Position Determination Technology Requiring Least Power;
    Disable Other Position Determination Technologies;
}
ELSE If (Tracking Device is Outdoors AND a GPS Signal Sensed){
    Enable GPS Position Determination Technology;
    Disable Other Position Determination Technologies;
}
ELSE IF (Tracking Device is Indoors AND Wi-Fi Signal Sensed){
    Enable Wi-Fi Position Determination Technology;
    Disable Other Position Determination Technologies;
}
ELSE IF (No GPS Signal Sensed and No Wi-Fi Signal Sensed){
    Enable One or More of Get Cell Location, AFLT, and/or Locaid ™
        Position
    Determination Technologies;
    Disable Other Position Determination Technologies;
}
ELSE {
    Use Last Known Location
}
```

In various cases, which of the available position determination technologies that are enabled for use is controlled by a central monitoring system. In one or more cases, which of the available position determination technologies is controlled by default settings on a tracking device which may be set at manufacturer or may be modified at the time the device is installed on a monitored target. In some cases, the aforementioned default settings may be modified based upon a situational analysis performed at the tracking device or at the central monitoring system. Such situational analysis may determined, for example, whether a situation demands increased location confidence. For example, where a monitored target is violating a rule on where the target may be, one or more additional position determination technologies or one position determination technology may be selected over another to enhance confidence in the location data being generated. As another example, where it is determined that an enabled position determination technology is providing intermittent results, one or more additional position determination technologies may be selected over another to enhance the ability to fix the location of the tracking device. Other situations may be triggered where, for example, a monitored target is a known gang member, has been engaged in domestic violence, is close to a physical boundary such as, for example, a school, or the tracking device is indicating a level of detected tampering.

Turning to FIG. 1a, a monitoring system 100 including Wi-Fi based locating capability is shown in accordance with various embodiments of the present invention. Monitoring system 100 may be tailored for tracking human subjects, however, it should be noted that various implementations and deployments of monitoring system 100 may be tailored for tracking non-human targets such as, for example, other animals or inanimate assets or objects. Such inanimate assets or objects may include, but are not limited to, automobiles, boats, equipment, shipping containers or the like. In one particular embodiment, monitoring system 100 is tailored for tracking delivery vehicles. Based upon the disclosure provided herein, one of ordinary skill in the art will recognize a variety of individuals, animals and/or assets that may be monitored in accordance with different embodiments of the present invention, and/or different monitoring scenarios or systems that may be modified to incorporate one or more features disclosed herein. Further, it should be noted that while monitoring system 100 is discussed as using a combination of GPS, Wi-Fi, AFLT and beacon based position determination technologies, that other position determination technologies may be used as well. Such other position determination technologies include, but are not limited to, Locaid™ and Get Cell.

Monitoring system 100 includes, but is not limited to, a target monitor device 120 that is physically coupled to a human subject 110 by a securing device 190. In some cases, securing device 190 is a strap that includes a tamper sensor that may be, but is not limited to, a continuity sensor that when broken indicates an error or tamper condition. Further, in some cases, the tamper sensor may be implemented as a proximity sensor that is able to detect when it has been moved away from an individual being monitored. When such movement away from the individual is detected, an error or tamper condition may be indicated. Based on the disclosure provided herein, one of ordinary skill in the art will recognize a variety of tamper sensors that may be incorporated in either target monitor device 120 or securing device 190 to allow for detection of removal of target monitor device 120 or other improper or unexpected meddling with target monitor 120. Further, based upon the disclosure provided herein, one of ordinary skill in the art will recognize a variety of monitors and/or securing devices that may be appropriate where the target of the monitoring is not a human or other animal subject, but rather an asset.

Target monitor device 120 is designed to provide the location of human subject 110 under a number of conditions. For example, when target monitor device 120 is capable of receiving wireless GPS location information 130, 131, 132 from a sufficient number of GPS satellites 145, 146, 147 respectively, target monitor device 120 may use the received wireless GPS location information to calculate or otherwise determine the location of human subject 110. Alternatively or in addition, the location of a beacon 180 that is local to target monitor device 120 may be used as the location of target monitor 120. As yet another alternative, an AFLT (i.e., advanced forward link trilateration) fix may be established based on cellular communication with target monitor 120. It should be noted that other types of earth based triangulation may be used in accordance with different embodiments of the present invention. As yet another alternative, when target monitor device 120 is capable of receiving Wi-Fi signals 182, 184, 186 from one or more Wi-Fi access points 181, 183, 185 respectively, target monitor device 120 may use the received Wi-Fi access point identification information along with signal strength information to resolve location. Based on the disclosure provided herein, one of ordinary skill in the art will recognize other types of earth based triangulation that may be used.

As yet another alternative, an AFLT fix may be established based on cellular communications between target monitor device 120 and a cellular communication system 150. Furthermore, when wireless communication link 133 between target monitor device 120 and cellular communications system 150 is periodically established, at those times, target monitor device 120 may report status and other stored records including location fixes to a central monitoring system 160 via wireless communication link 138.

Monitoring system 100 includes a one beacon 180. Within FIG. 1a, a telemetric wireless link 141 has been depicted between beacon 180a and target monitor 120. Each beacon 180 has an adjustable range to make telemetric wireless contact with target monitor 120. At any point in time, depending on each beacon's 180 relative distance to target monitor 120, none, one, or more than one tracking beacons 180 may be within transmission range of a single target monitor 120. Likewise, it is further conceivable under various circumstances that more than one target monitor device 120 at times be within in range of a solitary beacon 180. In some cases, a Wi-Fi receiver within target monitor device 120 may have a broadcasting mode that could be used to broadcast to another Wi-Fi module acting as a Beacon. This would alleviate the need for proprietary radio frequency components and antennas from a design.

Telemetric wireless communications path 141 established at times between tracking beacon 180a and target monitor device 120 illustrates a common feature of various different embodiments of the current invention. Some embodiments of the various inventions vary on how, i.e. protocol, and what information and/or signaling is passed over wireless link 141. For example, in more simplified configurations and embodiments, each beacon 180 is limited to repetitively transmitting its own beacon ID and physical location information. In that way, once target monitor device 120 is within transmission range of tracking beacon 180a and establishes wireless or wired reception 141, then target monitor device 120 can record and store received beacon ID and location information. At a later time, for some embodiments of the present invention, target monitor device 120 can then report recorded readings from beacons 180 to the central monitoring system 160 over the cellular communication system 150 using wireless links 133 and 138 as depicted in FIG. 1a. Furthermore, many embodiments allow for such transmissions and information passing to occur without being noticed by human subject 110, and unnoticed, automatically, and near effortlessly central monitoring system 160 is able to establish records and track human subject's 110 movements and whereabouts.

In other embodiments or configurations according to the present invention, each beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the location reported by each of beacons 180 is accurate. Various other details about a beacon based system are disclosed in U.S. patent application Ser. No. 12/041,746 entitled "Beacon Based Tracking Devices and Methods for Using Such" and filed Mar. 4, 2008 by Buck et al. The entirety of the aforementioned reference is incorporated herein by reference for all purposes.

Likewise, in some other embodiments, each target monitor device 120 contains a host of their own power status, tampering, shielding, movement, and/or other sensors related to its own device health. While still further embodiments also include a host of other measurement transducers within target monitor device 120 for extracting information, and for later reporting, related to physical properties of human subject 110. For example, measuring for the presence of alcohol and/or other drugs present in human subject 110 may be included in some embodiments of target monitor 120. As one example, the alcohol sensor discussed in U.S. Pat. No. 7,930,927 entitled "Transdermal Portable Alcohol Monitor and Methods for Using Such" and filed by Cooper et al. on Mar. 4, 2008. The entirety of the aforementioned reference is incorporated herein by reference for all purposes.

Beacons 180 in alternative embodiments of the present invention may communicate with central monitoring system 160 independently of target monitor 120. The monitoring system 100 illustrated in FIG. 1a shows beacon 180b having both a wireless communication link 135 with cellular communication system 150, and also illustrates beacon 180b having a hardwired communication link 139 with land communication system 170. Monitoring system 100 is also shown with beacons 180a, 180b, and 180c each having hardwired land communication links 140, 139, and 136 respectively to land communication system 170. Monitoring system 100 further illustrates land communication system 170 having a hardwired communication link 134 to cellular communication system 150, and a hardwired communication link 137 to central monitoring system 160.

In some embodiments of the present invention, beacons 180 are located in areas frequented by human subject 110 where target monitor device 120 is incapable of accessing information from the GPS system. Such beacons eliminate the need to perform an AFLT fix and avoid the costs associated therewith. As an example, human subject 110 may have a tracking beacon 180 placed within his home, and one also placed at his place of employment in close proximity to his work area. In this way, the two placed beacons, each at different prescribed times, can interact with his attached target monitor device 120 to periodically make reports to central monitoring system 160 to track movements and the whereabouts of human subject 110. All this can be done without incurring the costs associated with performing an AFLT fix.

Monitoring system 100 further includes a control station 191 that is communicably coupled to central monitoring system 160 via a communication link 192. In one particular embodiment of the present invention, control station 191 is a personal computer including a display device, a processor, and/or one or more I/O devices. Based upon the disclosure provided herein, one of ordinary skill in the art will recognize a variety of systems that may be used as control station 191 including highly tailored application specific control systems. A Wi-Fi location service provider 194 is communicably coupled to control station 191 and provides for converting Wi-Fi access point and signal strength information provided from target monitor device 120 into a physical location.

Central monitoring system 160 includes functionality for sending alerts to a user interaction system 185 when a tracked target ventures into a prohibited zone as updated by the adaptive zone update control, for providing location information indicating a location of target monitor 120, and/or for receiving a request to place target monitor device 120 into one or more supported modes of operation. User interaction system 185 may be, but is not limited to, a law enforcement computer deployed at a dispatch station of the law enforcement facility or a hand held computer maintained by a law enforcement official. Based upon the disclosure provided herein, one of ordinary skill in the art will recognize a variety of user interaction systems 185 that may be used in relation to one or more of the embodiments discussed herein. Further, it should be noted that such a system is not limited to use in relation to law enforcement.

Figure 1B:
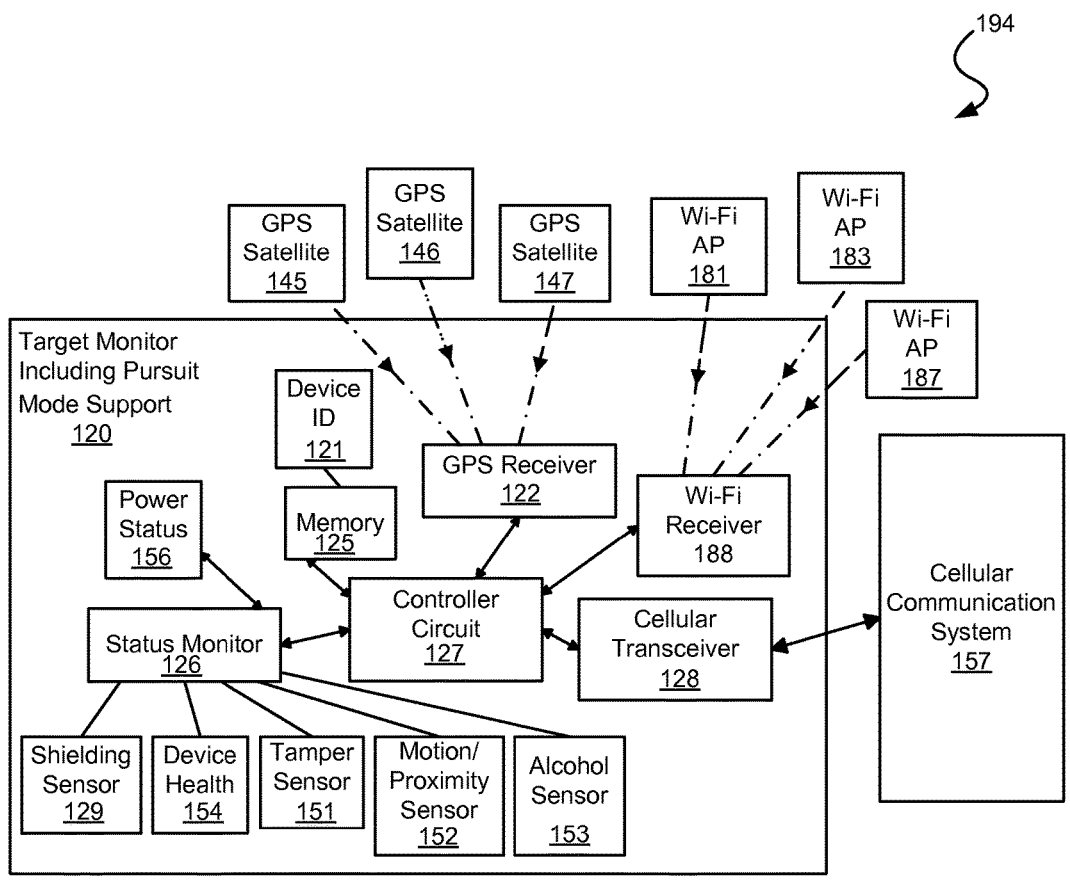
FIG. 1b is a block diagram of a target monitor device including Wi-Fi based locating support in accordance with one or more embodiments of the present invention.

Turning to FIG. 1b, a block diagram 194 of target monitor device 120 including Wi-Fi based locating support is shown in accordance with one or more embodiments of the present invention. As shown, target monitor device 120 includes a device ID 121 that may be maintained in a memory 125, and thus is accessible by a controller circuit 127. Controller circuit 127 is able to interact with a GPS receiver 122 and memory 125 at times for storing and generating records of successively determined GPS locations. Similarly, controller circuit 127 is able to interact with a Wi-Fi receiver 188 and memory 125 at times for storing and generating records of successively determined Wi-Fi access point identifications and signal strength. As target monitor device 120 comes within range of one or more Wi-Fi access points (e.g., Wi-Fi access point 181, Wi-Fi access point 183 Wi-Fi access point 187), Wi-Fi receiver 188 senses the signal provided by the respective Wi-Fi access points, and provides an identification of the respective Wi-Fi access point and a signal strength of the signal received from the Wi-Fi access point to Wi-Fi receiver 188. This information is provided to controller circuit 127 which stores the information to memory 125.

Where target monitor device 120 is operating in a standard mode, controller circuit 127 causes an update and reporting of the location of target monitor device 120 via a cellular transceiver 128 and a cellular communication system 157 in accordance with a first time period. In contrast, where target monitor device 120 is within range of a public Wi-Fi access point, reporting the location of target monitor device 120 may be done via the public Wi-Fi access point in place of the cellular communication link. Which technologies are used to update the location of target monitor device 120 may be selected either by default, by programming from a central monitor system (not shown), or based upon scenarios. For example, it may be determined whether sufficient battery power as reported by power status 156 remains in target monitor device 120 to support a particular position determination technology. Where insufficient power remains, the particular technology is disabled. In some cases, a maximum cost of resolving location may be set for target monitor device 120. For example, resolving Wi-Fi location data may incur a per transaction cost to have a third party service provider resolve the location information. When a maximum number of resolution requests have been issued, the Wi-Fi position determination technology may be disabled. Further, it may be determined the likelihood that a particular position determination technology will be capable of providing meaningful location information. For example, where target monitor device 120 is moved indoors, GPS receiver 122 may be disabled to save power. Alternatively, where the tracking device is traveling at relatively high speeds, the Wi-Fi receiver 188 may be disabled. As yet another example, where cellular phone jamming is occurring, support for AFLT position determination may be disabled. As yet another example, where GPS jamming is occurring, GPS receiver 122 may be disabled. As yet another example, where target monitor device 120 is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as AFLT or GPS may be used.

In one particular embodiment of the present invention, which position determination technologies are enabled may follow the following decision tree:

```
IF (Power Status 156 indicates battery low for Target
Monitor Device 120){
    Enable Position Determination Technology Requiring Least Power;
    Disable Other Position Determination Technologies;
}
ELSE If (Target Monitor Device 120 is Outdoors AND a GPS
Signal Sensed by GPS Receiver 122){
    Enable GPS Receiver 122;
    Disable Other Position Determination Technologies;
}
ELSE IF (Target Monitor Device 120 is Indoors AND Wi-Fi
Signal Sensed by Wi-Fi Receiver 188){
    Enable Wi-Fi Receiver 188;
    Disable Other Position Determination Technologies;
}
ELSE IF (No GPS Signal Sensed by GPS Receiver 122 and No
Wi-Fi Signal Sensed by Wi-Fi Receiver 188){
    Enable Support for One or More of Get Cell Location,
    AFLT, and/or
    Locaid ™ Position
Determination Technologies;
    Disable Other Position Determination Technologies;
}
ELSE {
    Use Last Known Location
}
```

Controller circuit 127 of target monitor device 120 at times functions in conjunction with cellular transceiver 128 to send and receive data and signals through cellular communication system 157. This link at times is useful for passing information and/or control signals between a central monitoring system (not shown) and target monitor device 120. The information transmitted may include, but is not limited to, location information, alcohol information, and information about the status of target monitor device 120. Based on the disclosure provided herein, one of ordinary skill in the art will recognize a variety of information that may be transferred via cellular communication system 157.

Various embodiments of target monitor device 120 include a variety of sensors capable of determining the status of target monitor 120, and of the individual associated therewith. For example, a status monitor 126 may include one or more of the following subcomponents: power status sensor 156 capable of indicating a power status of target monitor 120. The power status may be expressed, for example as a percentage of battery life remaining. Based upon the disclosure provided herein, one of ordinary skill in the art will recognize a variety of forms in which power status may be expressed. In addition, target monitor device 120 includes a set of shielding sensors 129 that are capable of determining whether target monitor device 120 is being shielded from receiving GPS signals and/or if GPS jamming is ongoing, a set of device health indicators 154, a tamper sensor 131 capable of determining whether unauthorized access to target monitor device 120 has occurred or whether target monitor device 120 has been removed from an associated human subject, a motion/proximity sensor 152 capable of determining whether target monitor device 120 is moving and/or whether it is within proximity of an individual associated with target monitor 120, and/or an alcohol sensor 153 such as that described herein. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into target monitor device 120 according to various different instances and/or embodiments of the present invention.

Figure 2:
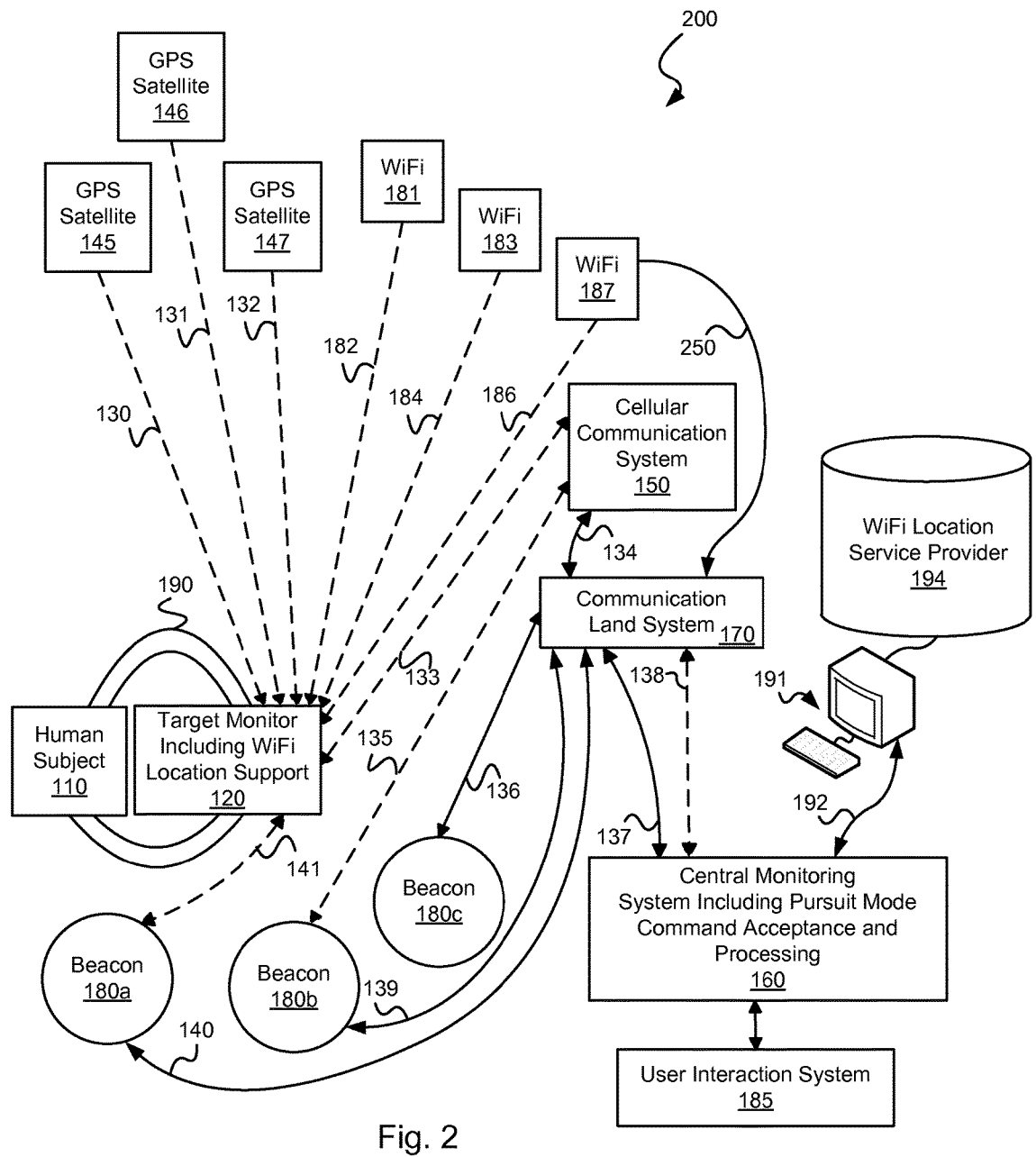
FIG. 2 is a block diagram illustrating another monitoring system including Wi-Fi based locating and Wi-Fi updating capability in accordance with other embodiments of the present invention.

Turning to FIG. 2, a block diagram illustrating another monitoring system 200 including Wi-Fi based locating and Wi-Fi updating capability in accordance with other embodiments of the present invention. Monitoring system 200 may be tailored for tracking human subjects, however, it should be noted that various implementations and deployments of monitoring system 200 may be tailored for tracking non-human targets such as, for example, other animals or inanimate assets or objects. Such inanimate assets or objects may include, but are not limited to, automobiles, boats, equipment, shipping containers or the like. In one particular embodiment, monitoring system 200 is tailored for tracking delivery vehicles. Based upon the disclosure provided herein, one of ordinary skill in the art will recognize a variety of individuals, animals and/or assets that may be monitored in accordance with different embodiments of the present invention, and/or different monitoring scenarios or systems that may be modified to incorporate one or more features disclosed herein. Further, it should be noted that while monitoring system 200 is discussed as using a combination of GPS, Wi-Fi, AFLT and beacon based position determination technologies, that other position determination technologies may be used as well. Such other position determination technologies include, but are not limited to, Locaid™ and Get Cell.

Monitoring system 200 includes, but is not limited to, a target monitor device 120 that is physically coupled to a human subject 110 by securing device 190. In some cases, securing device 190 is a strap that includes a tamper sensor that may be, but is not limited to, a continuity sensor that when broken indicates an error or tamper condition. Further, in some cases, the tamper sensor may be implemented as a proximity sensor that is able to detect when it has been moved away from an individual being monitored. When such movement away from the individual is detected, an error or tamper condition may be indicated. Based on the disclosure provided herein, one of ordinary skill in the art will recognize a variety of tamper sensors that may be incorporated in either target monitor device 120 or securing device 190 to allow for detection of removal of target monitor device 120 or other improper or unexpected meddling with target monitor 120. Further, based upon the disclosure provided herein, one of ordinary skill in the art will recognize a variety of monitors and/or securing devices that may be appropriate where the target of the monitoring is not a human or other animal subject, but rather an asset.

Target monitor device 120 is designed to provide the location of human subject 110 under a number of conditions. For example, when target monitor device 120 is capable of receiving wireless GPS location information 130, 131, 132 from a sufficient number of GPS satellites 145, 146, 147 respectively, target monitor device 120 may use the received wireless GPS location information to calculate or otherwise determine the location of human subject 110. Alternatively or in addition, the location of a beacon 180 that is local to target monitor device 120 may be used as the location of target monitor 120. As yet another alternative, an AFLT (i.e., advanced forward link trilateration) fix may be established based on cellular communication with target monitor 120. It should be noted that other types of earth based triangulation may be used in accordance with different embodiments of the present invention. As yet another alternative, when target monitor device 120 is capable of receiving Wi-Fi signals 182, 184, 186 from one or more Wi-Fi access points 181, 183, 185 respectively, target monitor device 120 may use the received Wi-Fi access point identification information along with signal strength information to resolve location. Based on the disclosure provided herein, one of ordinary skill in the art will recognize other types of earth based triangulation that may be used.

As yet another alternative, an AFLT fix may be established based on cellular communications between target monitor device 120 and a cellular communication system 150. Furthermore, when wireless communication link 133 between target monitor device 120 and cellular communications system 150 is periodically established, at those times, target monitor device 120 may report status and other stored records including location fixes to a central monitoring system 160 via wireless communication link 138.

Monitoring system 100 includes beacon 180. Within FIG. 2, a telemetric wireless link 141 has been depicted between beacon 180a and target monitor 120. Each beacon 180 has an adjustable range to make telemetric wireless contact with target monitor 120. At any point in time, depending on each beacon's 180 relative distance to target monitor 120, none, one, or more than one tracking beacons 180 may be within transmission range of a single target monitor 120. Likewise, it is further conceivable under various circumstances that more than one target monitor device 120 at times be within in range of a solitary beacon 180. In some cases, a Wi-Fi receiver within target monitor device 120 may have a broadcasting mode that could be used to broadcast to another Wi-Fi module acting as a Beacon. This would alleviate the need for proprietary radio frequency components and antennas from a design.

Telemetric wireless communications path 141 established at times between tracking beacon 180a and target monitor device 120 illustrates a common feature of various different embodiments of the current invention. Some embodiments of the various inventions vary on how, i.e. protocol, and what information and/or signaling is passed over wireless link 141. For example, in more simplified configurations and embodiments, each beacon 180 is limited to repetitively transmitting its own beacon ID and physical location information. In that way, once target monitor device 120 is within transmission range of tracking beacon 180a and establishes wireless or wired reception 141, then target monitor device 120 can record and store received beacon ID and location information. At a later time, for some embodiments of the present invention, target monitor device 120 can then report recorded readings from beacons 180 to the central monitoring system 160 over the cellular communication system 150 using wireless links 133 and 138 as depicted in FIG. 2. Furthermore, many embodiments allow for such transmissions and information passing to occur without being noticed by human subject 110, and unnoticed, automatically, and near effortlessly central monitoring system 160 is able to establish records and track human subject's 110 movements and whereabouts.

In other embodiments or configurations according to the present invention, each beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the location reported by each of beacons 180 is accurate.

Likewise, in some other embodiments, each target monitor device 120 contains a host of their own power status, tampering, shielding, movement, and/or other sensors related to its own device health. While still further embodiments also include a host of other measurement transducers within target monitor device 120 for extracting information, and for later reporting, related to physical properties of human subject 110. For example, measuring for the presence of alcohol and/or other drugs present in human subject 110 may be included in some embodiments of target monitor 120.

Beacons 180 in alternative embodiments of the present invention may communicate with central monitoring system 160 independently of target monitor 120. The monitoring system 100 illustrated in FIG. 1a shows beacon 180b having both a wireless communication link 135 with cellular communication system 150, and also illustrates beacon 180b having a hardwired communication link 139 with land communication system 170. Monitoring system 100 is also shown with beacons 180a, 180b, and 180c each having hardwired land communication links 140, 139, and 136 respectively to land communication system 170. Monitoring system 100 further illustrates land communication system 170 having a hardwired communication link 134 to cellular communication system 150, and a hardwired communication link 137 to central monitoring system 160.

In some embodiments of the present invention, beacons 180 are located in areas frequented by human subject 110 where target monitor device 120 is incapable of accessing information from the GPS system. Such beacons eliminate the need to perform an AFLT fix and avoid the costs associated therewith. As an example, human subject 110 may have a tracking beacon 180 placed within his home, and one also placed at his place of employment in close proximity to his work area. In this way, the two placed beacons, each at different prescribed times, can interact with his attached target monitor device 120 to periodically make reports to central monitoring system 160 to track movements and the whereabouts of human subject 110. All this can be done without incurring the costs associated with performing an AFLT fix.

Monitoring system 100 further includes a control station 191 that is communicably coupled to central monitoring system 160 via a communication link 192. In one particular embodiment of the present invention, control station 191 is a personal computer including a display device, a processor, and/or one or more I/O devices. Based upon the disclosure provided herein, one of ordinary skill in the art will recognize a variety of systems that may be used as control station 191 including highly tailored application specific control systems. A Wi-Fi location service provider 194 is communicably coupled to control station 191 and provides for converting Wi-Fi access point and signal strength information provided from target monitor device 120 into a physical location.

Central monitoring system 160 includes functionality for sending alerts to a user interaction system 185 when a tracked target ventures into a prohibited zone as updated by the adaptive zone update control, for providing location information indicating a location of target monitor 120, and/or for receiving a request to place target monitor device 120 into one or more supported modes of operation. User interaction system 185 may be, but is not limited to, a law enforcement computer deployed at a dispatch station of the law enforcement facility or a hand held computer maintained by a law enforcement official. Based upon the disclosure provided herein, one of ordinary skill in the art will recognize a variety of user interaction systems 185 that may be used in relation to one or more of the embodiments discussed herein. Further, it should be noted that such a system is not limited to use in relation to law enforcement.

Of note, Wi-Fi access point 187 is either a public Wi-Fi access point or a Wi-Fi access point accessible to target monitor device 120. In such a case, information from target monitor device 120 can be communicated to central monitoring system 160 via Wi-Fi access point 187 using a communication link 250 between Wi-Fi access point 187 and communication land system 170. Such a communication channel between target monitor device 120 and central monitoring system 160 allows for offloading information from target monitor device 120 which can reduce the cost of data transmission and reduce the power required to send data to the host. The percentage of transfer data that would otherwise be transferred via a cellular link could be offloaded using communication via Wi-Fi access point 187 would have an equivalent percentage of increase in battery life because it typically requires less power to send data over Wi-Fi than cellular.

Figure 3:
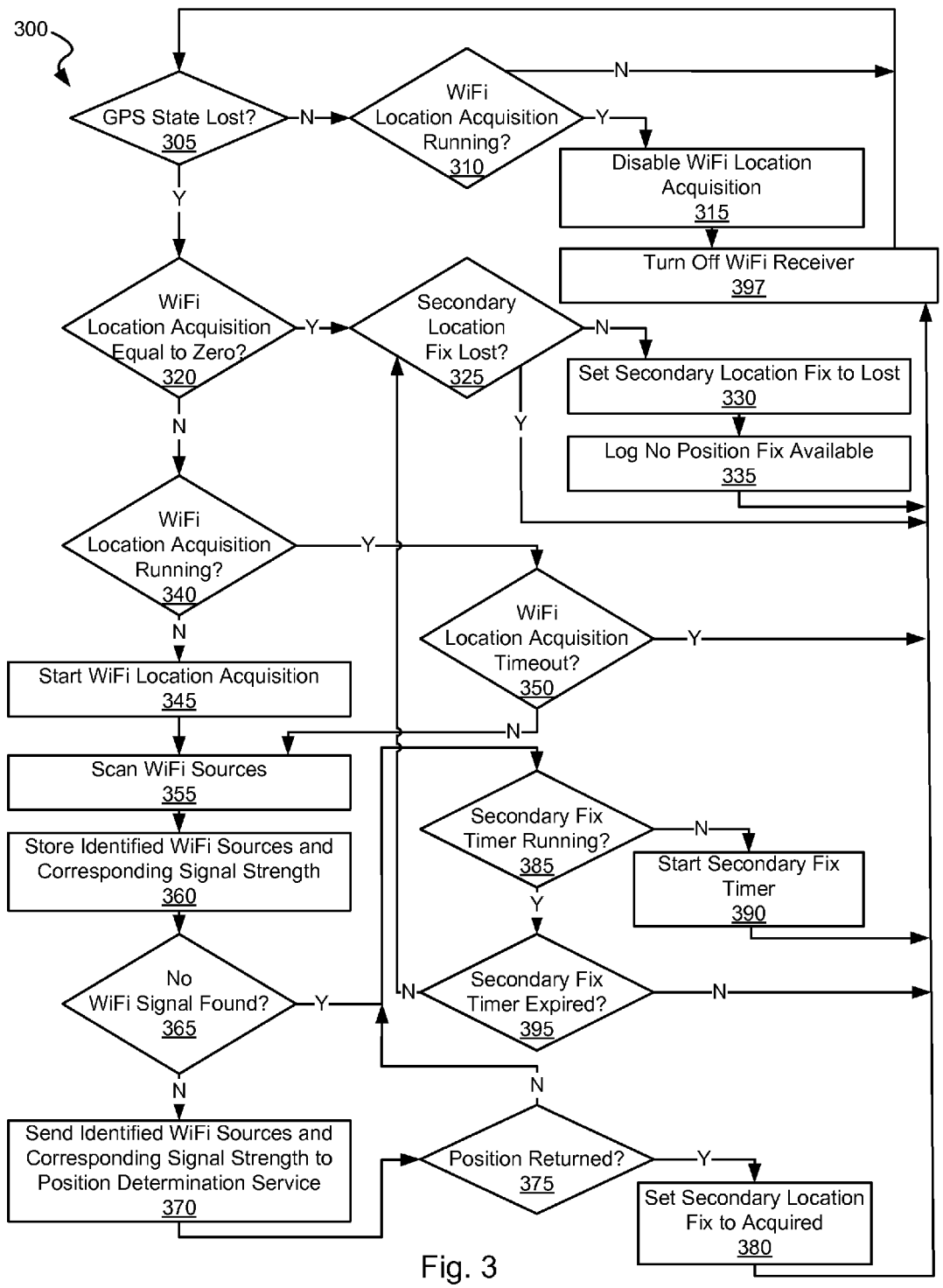
FIG. 3 is a flow diagram depicting a method for location determination based upon a combination of both GPS and Wi-Fi in accordance with some embodiments of the present invention.

Turning to FIG. 3, a flow diagram 300 shows a method for location determination based upon a combination of both GPS and Wi-Fi in accordance with some embodiments of the present invention. Following flow diagram 300, it is determined whether the GPS state has been lost (block 305). Where GPS location has not been lost (block 305), location data is being generated by GPS location technology and therefore Wi-Fi location acquisition capability may be disabled. It is determined whether Wi-Fi location acquisition capability is running (block 310). Where Wi-Fi location acquisition capability is running (block 310), Wi-Fi location acquisition capability is disabled (block 315) and the Wi-Fi receiver is turned off to save power (block 397).

Alternatively, where GPS location has been lost (block 305), it is determined whether Wi-Fi location acquisition is equal to zero (block 320). When the Wi-Fi location acquisition equals zero it signifies that Wi-Fi location data is not available. Where Wi-Fi location acquisition is equal to zero (block 320), it is determined whether a secondary location fix is indicated as lost (block 325). Where the secondary location fix is not indicated as lost (block 325), the secondary location fix is set to lost (block 330) and the lack of a position fix is logged as not available (block 335).

Alternatively, where Wi-Fi location acquisition is not equal to zero (block 320), it is determined whether Wi-Fi location acquisition capability is running (block 340). Where Wi-Fi location acquisition capability is not already running (block 340), Wi-Fi location acquisition is started (block 345). This may include, for example, powering on a Wi-Fi receiver. Alternatively, where Wi-Fi location acquisition capability is already running (block 340), it is determined whether a timeout condition has occurred (block 350). Where a timeout condition has occurred (block 350), the Wi-Fi receiver is turned off (block 397).

With the Wi-Fi location acquisition operating, the target monitor device scans for Wi-Fi signals (block 355), and based upon sensed Wi-Fi Signals identifies one or more Wi-Fi sources or access points and the corresponding signal strengths. The identified Wi-Fi sources and corresponding signal strengths are stored to a memory in the target monitor device (block 360). It is determined whether any Wi-Fi signal is found (block 365). Where a Wi-Fi signal is found (block 365), the identified Wi-Fi source(s) and corresponding signal strength(s) are forwarded to a service provider that resolves location based upon the provided information (block 370). It is then determined whether a physical location or position is returned for the provided Wi-Fi information (block 375). Where a position is returned (block 375), the secondary location fix is set to acquired (block 380).

Alternatively, where either no Wi-Fi signal is found (block 365) or no position is returned for a found Wi-Fi signal (block 375), it is determined whether a secondary fix timer is running (block 385). Where the secondary fix timer is not running (block 385), it is started (block 385). Where the secondary fix timer is running (block 385), it is determined whether the timer has expired (block 395). Where the timer has not expired (block 395), the process of indicating the secondary fix location to lost begins at block 325.

Figure 4:
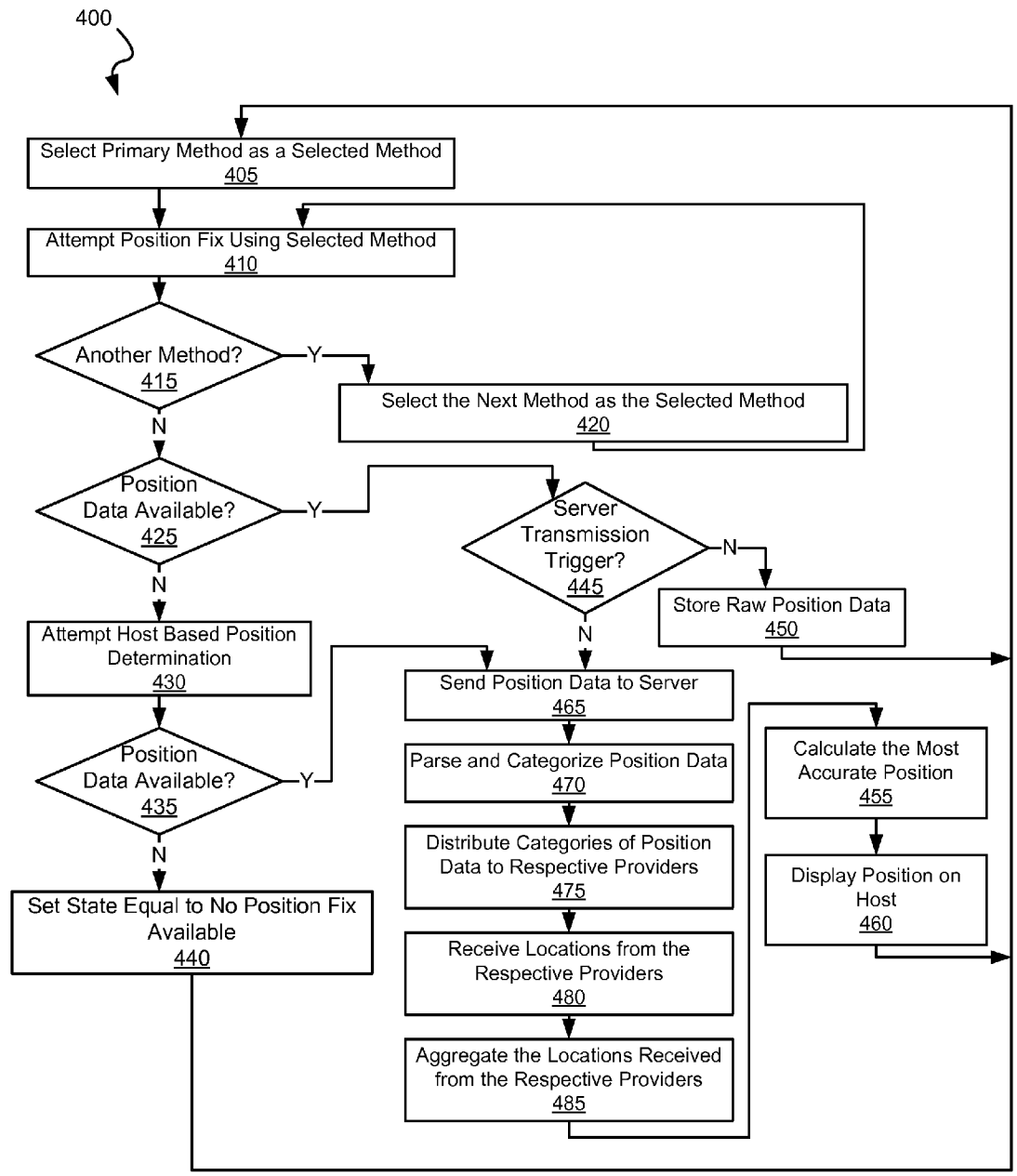
FIG. 4 is a flow diagram showing a method for generating location data based upon a number of different location sources and generating a unified location from data available from two or more sources in accordance with various embodiments of the present invention.

Turning to FIG. 4, a flow diagram 400 depicts a method for generating location data based upon a number of different location sources and generating a unified location from data available from two or more sources in accordance with various embodiments of the present invention. Following flow diagram 400, a primary method of location determination is selected as a selected method (block 405), and an attempt to determine a location of the target monitor device is performed (block 410).

It is then determined whether another method of location determination is also enabled (block 415). Where another method is enabled (block 415), the next enabled method is selected as the selected method and the processes of blocks 410-415 are performed for the next selected method. As an example, GPS location determination may be enabled as a primary method of location determination, and Wi-Fi and AFLT may be enabled as secondary methods. Based upon the disclosure provided herein, one of ordinary skill in the art will recognize a variety of other configurations that may be supported in accordance with other embodiments of the present invention.

Once the enabled methods of location determination have been performed it is determined whether any position data (i.e., location of the target monitor device) was derived from the methods (block 425). Where no position data is available (block 425), one or more host based positioning algorithms may be performed by a central monitoring system to ascertain the location of the target monitor device (block 430). It is then determined whether any position data was derived from the host based processes (block 435). Where no position data is available (block 435), the processing state is set to "No Position Fix Available" (block 440).

Alternatively, where position data is available from the non-host based methods (block 425), it is determined whether data is to be transmitted to a central monitor system (block 445).

This determination may be made based, for example, upon the occurrence of a server transmission trigger signal. Where no transmission is called for or enabled (block 445), the location data is stored to the memory of the target monitor device (block 450).

Alternatively, where either data is to be transmitted to a central monitor system (block 445) or position data is available from the host based processes (block 435), position data is sent to a server which is part of a central monitoring system (block 465).

The server receiving the position data parses and categorizes the received position data (block 470). This includes, for example, combining the Wi-Fi access point identification(s) and corresponding signal strength(s) in a category separate from other types of position data. The different categories of position data are then distributed to service providers servicing that particular type of position data (block 475). For example, the Wi-Fi access point identification(s) and corresponding signal strength(s) are distributed to a service provider capable of generating physical location information based upon Wi-Fi access point identification(s) and corresponding signal strength(s). In turn, the respective service providers return physical location information derived from the provided position data (block 480). Where two or more physical locations are derived based upon different position data from different location determination technologies, the physical locations are aggregated (block 485), and a unified physical location is calculated based upon the aggregated physical location data (block 455). This may be done, for example, by averaging the received physical location data. This determined physical location is then displayed to a host (block 460).

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. For example, the Wi-Fi based positioning may be replaced by or may be augmented by another RF source based triangulation such as, for example, TV towers, radio towers, or the like. Therefore, the above description should not be taken as limiting the scope of the invention, which is defined by the appended claims.

What is claimed is:

1. A monitoring system, the monitoring system comprising:
   a monitoring device including:
      a power status sensor operable to indicate a power status of the monitoring device;
      a GPS based location determination circuit operable to identify a GPS based location of the monitoring device using GPS signals;
      a Wi-Fi based location determination circuit operable to identify a Wi-Fi access point and a corresponding signal strength from a Wi-Fi signal; and
      a controller circuit operable to:
         selectively disable one of the GPS based location determination circuit or the Wi-Fi based location determination circuit based upon both: (a) the power status, and (2) a financial cost of resolving the location of the monitoring device based upon the Wi-Fi access point and the corresponding signal strength from the Wi-Fi signal; and
         transmit a transmission data set derived from one of the GPS based location determination circuit or the Wi-Fi based location determination circuit to a central monitoring controller, wherein the transmission data set includes the Wi-Fi access point and the corresponding signal strength to a Wi-Fi based location of the monitoring device, and wherein the central monitoring controller is operable to resolve the Wi-Fi access point and the corresponding signal strength to a Wi-Fi based location of the monitoring device by:
            transmitting the Wi-Fi access point and the corresponding signal strength to a service provider; and
            receiving the Wi-Fi based location from the service provider.

2. The monitoring system of claim 1, wherein the monitoring device further includes:

a cellular transmitter; and
wherein transmitting the transmission data set to the central monitoring controller is done using the cellular transmitter via a cellular network.

3. The monitoring system of claim 1, wherein the Wi-Fi based location determination circuit includes:
a Wi-Fi transmitter; and
wherein transmitting the transmission data set to the central monitoring controller is done using the Wi-Fi transmitter via the Wi-Fi access point.

4. The monitoring system of claim 1, wherein the monitoring device further comprises:
wherein the power status is a low power status, and wherein selectively disabling the one of the GPS based location determination circuit or the Wi-Fi based location determination circuit includes disabling the GPS based location determination circuit based at least in part on the low power status.

5. A method for location determination, the method comprising:
providing a monitoring device including a plurality of location determination circuits,
determining a condition set, the condition set including at least a power status and a financial cost of determining a location of the monitoring device based upon identifying a Wi-Fi access point and a corresponding signal strength from a Wi-Fi signal;
selectively disabling one of the GPS based location determination circuit or the Wi-Fi based location determination circuit based upon the condition set; and
transmitting a transmission data set derived from one of the GPS based location determination circuit or the Wi-Fi based location determination circuit to a central monitoring controller, wherein the transmission data set includes the Wi-Fi access point and the corresponding signal strength to a Wi-Fi based location of the monitoring device, and wherein the central monitoring controller is operable to resolve the Wi-Fi access point and the corresponding signal strength to a Wi-Fi based location of the monitoring device by:
transmitting the Wi-Fi access point and the corresponding signal strength to a service provider; and
receiving the Wi-Fi based location from the service provider.

6. The method of claim 5, wherein the monitoring device further includes:
a cellular transmitter; and
wherein the method further comprises transmitting a location data generated from at least one of the GPS based location determination circuit and the Wi-Fi based location determination circuit to a central monitoring controller using the cellular transmitter via a cellular network.

7. The method of claim 5, wherein the monitoring device further includes:
a Wi-Fi transmitter; and
wherein the method further comprises transmitting a location data generated from at least one of the GPS based location determination circuit and the Wi-Fi based location determination circuit to a central monitoring controller using the Wi-Fi transmitter via the Wi-Fi access point.

8. The method of claim 5, wherein the monitoring device further comprises:

a power status sensor circuit operable to indicate a low power status of a battery operating the monitoring device;
wherein the condition set includes the low power status; and
wherein selectively disabling the selected subset of the plurality of location determination circuits based upon the condition set includes disabling the GPS based location determination circuit based at least in part on the low power status.

9. The method of claim 5, wherein the condition set further includes an indication of a number of issued resolution requests, and wherein selectively disabling the selected subset of the plurality of location determination circuits based upon the condition set includes disabling the Wi-Fi based location determination circuit based upon the number of issued resolution requests.

10. The method of claim 5, wherein the condition set further includes an indication that the monitoring device is indoors, and wherein selectively disabling the selected subset of the plurality of location determination circuits based upon the condition set includes disabling the GPS based location determination circuit.

11. The method of claim 5, wherein the condition set further includes a rate at which the monitoring device is moving, and wherein selectively disabling the selected subset of the plurality of location determination circuits based upon the condition set includes disabling the Wi-Fi based location determination circuit when the rate at which the monitoring device is moving is more than a given rate.

12. A monitoring device, the monitoring device comprising:
a GPS based location determination circuit operable to identify a GPS based location of the monitoring device using GPS signals;
a Wi-Fi based location determination circuit operable to identify a Wi-Fi access point and a corresponding signal strength from a Wi-Fi signal;
a cellular based location determination circuit operable to identify a cellular access point; and
a controller circuit operable to:
determine a condition set, wherein the condition set includes at least two elements selected from a group consisting of: a power status of the monitoring device, a financial cost of determining the location of the monitoring device based upon the Wi-Fi access point and the corresponding signal strength from a Wi-Fi signal, an indication that the monitoring device is indoors, a rate at which the monitoring device is moving, and an indication of a number of issued resolution requests; and
selectively disable at least one of the GPS based location determination circuit, the cellular based location determination circuit or the Wi-Fi based location determination circuit based upon at least two elements of the condition set, wherein at least one element of the at least two elements of the condition set is the financial cost of determining the location of the monitoring device based upon the Wi-Fi access point and the corresponding signal strength from a Wi-Fi signal; and
transmit a transmission data set derived from one of the GPS based location determination circuit, the cellular based location determination circuit, or the Wi-Fi based location determination circuit to a central monitoring controller, wherein the transmission data set includes the Wi-Fi access point and the corresponding signal strength, and wherein the central monitoring controller is operable to resolve the Wi-Fi access point and the corresponding signal strength to a Wi-Fi based location of the monitoring device by:
transmitting the Wi-Fi access point and the corresponding signal strength to a service provider; and
receiving the Wi-Fi based location from the service provider.

13. The monitoring system of claim 12, wherein the condition set includes the indication that the monitoring device is indoors, and wherein selectively disabling the at least one of the GPS based location determination circuit, the cellular based location determination circuit or the Wi-Fi based location determination circuit based upon the condition set includes disabling the GPS based location determination circuit.

14. The monitoring system of claim 12, wherein the condition set includes the rate at which the monitoring device is moving, and wherein selectively disabling the at least one of the GPS based location determination circuit, the cellular based location determination circuit or the Wi-Fi based location determination circuit based upon the condition set includes disabling the Wi-Fi based location determination circuit when the rate at which the monitoring device is moving is more than a given rate.

15. A monitoring system, the monitoring system comprising:
a monitoring device including:
a GPS based location determination circuit operable to identify a GPS based location of the monitoring device using GPS signals;
a Wi-Fi based location determination circuit operable to identify a Wi-Fi access point and a corresponding signal strength from a Wi-Fi signal; and
a controller circuit operable to:
determine a condition set, wherein the condition set includes at least two elements selected from a group consisting of: a power status of the monitoring device, a cost of determining the location of the monitoring device based upon the Wi-Fi access point and the corresponding signal strength from the Wi-Fi signal, an indication that the monitoring device is indoors, a rate at which the monitoring device is moving, and an indication of a number of issued resolution requests;
selectively disable one of the GPS based location determination circuit or the Wi-Fi based location determination circuit based upon a combination of at least two elements of the condition set, wherein at least one element of the at least two elements of the condition set is the financial cost of determining the location of the monitoring device based upon the Wi-Fi access point and the corresponding signal strength from a Wi-Fi signal; and
transmit a transmission data set derived from one of the GPS based location determination circuit or the Wi-Fi based location determination circuit to a central monitoring controller, wherein the transmission data set includes the Wi-Fi access point and the corresponding signal strength to a Wi-Fi based location of the monitoring device, and wherein the central monitoring controller is operable to resolve the Wi-Fi access point and the corresponding signal strength to a Wi-Fi based location of the monitoring device by:
transmitting the Wi-Fi access point and the corresponding signal strength to a service provider; and
receiving the Wi-Fi based location from the service provider.

16. The monitoring system of claim 15, wherein the condition set includes the indication that the monitoring device is indoors, and wherein selectively disabling the one of the GPS based location determination circuit or the Wi-Fi based location determination circuit based upon the condition set includes disabling the GPS based location determination circuit.

17. The monitoring system of claim 15, wherein the condition set includes the rate at which the monitoring device is moving, and wherein selectively disabling the one of the GPS based location determination circuit or the Wi-Fi based location determination circuit based upon the condition set includes disabling the Wi-Fi based location determination circuit when the rate at which the monitoring device is moving is more than a given rate.

18. The monitoring system of claim 15, wherein the condition set includes the indication of a number of issued resolution requests, and wherein selectively disabling the one of the GPS based location determination circuit or the Wi-Fi based location determination circuit based upon the condition set includes disabling the Wi-Fi based location determination circuit based upon the number of issued resolution requests.

19. The monitoring system of claim 15, wherein the monitoring device further includes a cellular based location circuit operable to identify a cellular based location of the monitoring device using cellular signals, wherein the condition set includes an indication that cellular phone jamming is occurring, and wherein the controller circuit is further operable to selectively disable the cellular based location circuit based upon the condition set.

* * * * *